Dec. 12, 1950          E. SCHULTZ          2,533,403
CASTER WITH GROUNDING LINK
Filed Oct. 8, 1947
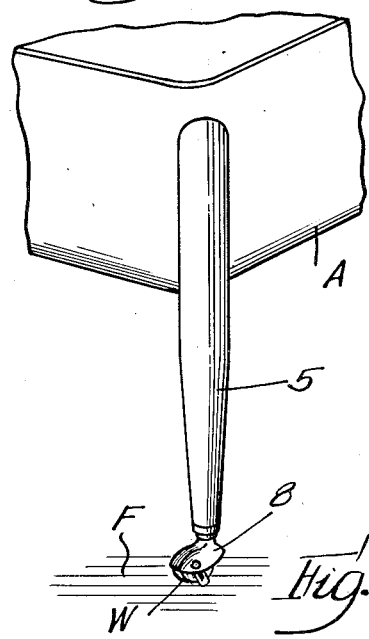
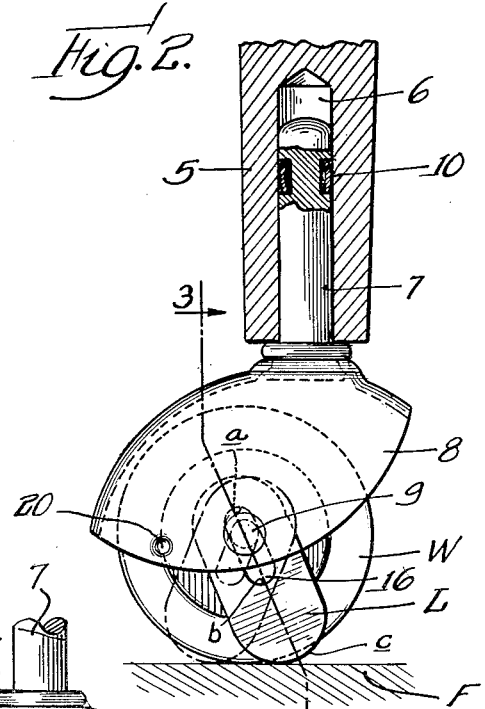
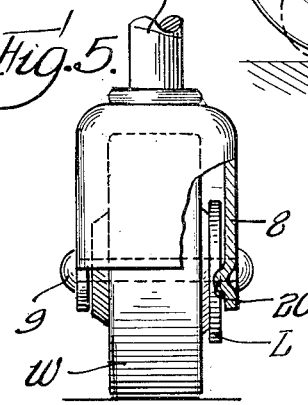
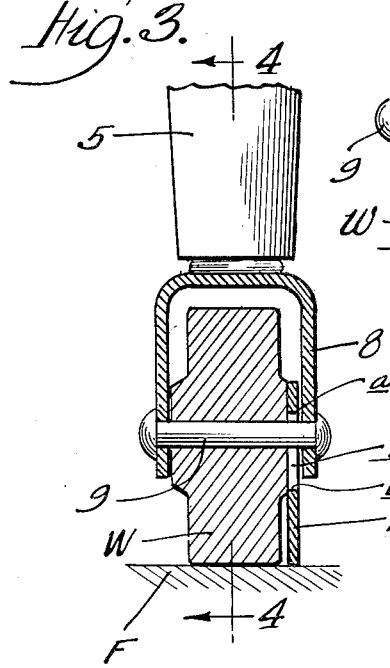
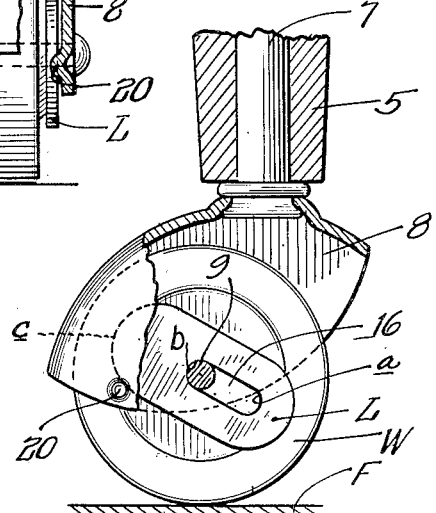
INVENTOR.
Edward Schultz
BY
Banning & Banning
Attys.

Patented Dec. 12, 1950

2,533,403

UNITED STATES PATENT OFFICE 2,533,403

CASTER WITH GROUNDING LINK

Edward Schultz, Chicago, Ill., assignor to The Nagel-Chase Mfg. Co., Chicago, Ill., a corporation of Illinois Application October 8, 1947, Serial No. 778,700

2 Claims. (Cl. 174—138)

This invention relates to a caster, and is designed primarily for casters which are used to support light machinery, such as washing machines.

It is often desirable that the caster wheel itself be of a composition material which, in consequence, has sufficient insulating value to prevent completion of an electrical circuit to the ground. Such a wheel is usually mounted in a yoke from which upstands a pintle that is received within a socket at the lower end of one of the legs of the machine which is to be movably supported. The yoke and pintle are desirably made of metal so that an electrical circuit is thereby established through to the axis of the wheel, but no further.

It is an object of this invention to provide a means for completing the circuit between the yoke and the ground where, for special reasons, such a connection is desired. The means for accomplishing this is exceedingly simple, and in no wise interferes with free movement of the caster wheel in either direction about its horizontal axis, or of the yoke about its vertical axis, or of both concurrently about their respective axes. I employ in this connection a small plate having an elongated slot through which is extended the axle pin of the wheel itself. The plate operates as a drag link, inclining rearwardly according to the direction of rolling movement of the wheel upon the floor. The position of this plate may change readily so as to incline in the opposite direction whenever the movement of the wheel is reversed.

Such a drag link plate is accommodated within the confines of the yoke whose width need not be appreciably widened for its reception. In addition, the yoke may be provided with an inwardly extending boss adapted to serve as a stop against which the drag link may be rested when turned around within the yoke through a distance of something more than 180°. When so rested against the stop, the drag link will remain in an up position where it is free of the floor. The provision of such a stop means makes it possible to maintain the drag link out of operative engagement with the floor if for any reason it is desired that there should be no circuit to the ground.

A suggestive embodiment of my invention is illustrated in the accompanying drawing wherein—

Figure 1 is a fragmentary perspective view of an apparatus, such as a washing machine, having depending legs one of which is here shown as equipped with the caster of my invention;

Fig. 2 is a side elevation of the caster in its operative relation to the leg of the machine which is shown in vertical section;

Fig. 3 is a vertical section through the caster, taken on line 3—3 of Fig. 2;

Fig. 4, which is a view similar to Fig. 2, but with a portion of the yoke broken away, shows the drag link in an inoperative position relative to the floor; and Fig. 5 is a rear elevation of the caster.

The suggestive apparatus A partially shown in Fig. 1, is equipped with suitable legs 5 each having at its lower end a socket 6 open at the bottom. Within the socket is accommodated the caster pintle 7 which upstands from the forward end of a yoke 8 between whose spaced walls at a rearward point is mounted an axle pin 9 traversing a caster wheel W which is commonly made of composition material having a high insulating value. The ends of the axle pin may be headed to secure it against axial displacement. The yoke here shown is in the general form of a hood providing an enclosure for the major portion of the wheel. A split spring ring 10 having a bowed exterior contour is adapted to engage with a registering groove in the pintle 7 and leg socket 6 to establish a releasable lock therebetween. Up to this point the caster, as described, is of conventional construction.

The means by which a circuit connection is maintained with the floor F on which the caster wheel W is rested may comprise a metallic link L having in one end region thereof an elongated slot 16 through which the axle pin 9 is extended. The slot 16 extends from a point adjacent the center of the link longitudinally thereof and terminates short of one end of the link and the other end of the link constitutes a gravity acting floor engaging portion. This link is accommodated between one side of the wheel and the proximate wall of the yoke 8. It is free for oscillatory and sliding movements relative to the axle pin within the limits of the two ends $a$ and $b$ of the slot 16. The upper end $a$ of the slot 16 is sufficiently distant from the lower end $c$ of the link to require the latter to incline out of the vertical, either forwardly or rearwardly, with capacity for upward sliding movement sufficient to shift its position from one side of center to the other. In use, therefore, the link will normally incline rearwardly of the direction of movement of the caster wheel over the floor, its lower end $c$ dragging on the floor F, to remain constantly in engagement therewith irrespective of irregularities in its surface. Any movement of the apparatus supported by the caster wheels, involving an oscillation of the pintles 7 within the sockets 6 of the legs, will proceed free of interference with the drag link. The link will remain inclined rearwardly as long as the direction of rolling movement of the caster wheel is not changed; if otherwise, however, the drag link will adjust itself as necessary through an upward sliding movement or an oscillating movement relative to the axle 9, remaining all the while in constant engagement with the floor F. By the construction described, the objective of maintaining a ground connection during all possible movements of the caster wheel is realized in full measure.

In the event that it is desired to hold the drag link off the floor, this may also be accomplished by a very simple and effective means. For this purpose I have provided a boss 20 which extends inwardly of the yoke side which is proximate to the drag link. Such a boss may conveniently be produced by a punching operation. The position of this boss is to one side of the axle (here shown as rearwardly thereof), and slightly thereabove, so as to furnish a rest for the drag link when its position within the yoke is reversed to present its lower end c uppermost and to one side of center. When so disposed, the drag link will remain in an inclined position against the boss and hidden for the most part within the hooded yoke, as suggested in Fig. 4. In this position the link will remain indefinitely due to the action of gravity. To restore the link to operative position, the link is rotated back past center so that it is then free to swing downwardly again to the position of Fig. 2.

In summary, the present caster whose wheel is of non-conducting material is characterized (1) by a link of conducting material which is supported from the yoke both pivotally and slidingly in such a manner as to drag along rearwardly of the wheel axis, regardless of the direction of its rolling movement over a floor, whereby an electrical connection to ground is maintained; and (2) by the provision of a stop means for supporting the link in a raised position off the floor, counter to gravity, when it is no longer desired to maintain the electrical connection to ground.

I claim:

1. A caster in which is comprised a non-conducting wheel, a yoke encasing the upper portion of the wheel and provided with spaced walls extending down along opposite sides of the wheel to a point below its axis, an axle pin for the wheel supported at its two ends by the spaced walls of the yoke, and an interiorly arranged drag link of conducting material fitted between one side of the wheel and the adjacent wall of the yoke, the drag link being formed endwise thereof with a closed slot through which the axle pin is extended in a manner to permit free movement of the link to slide lengthwise upon the pin and also to rotate thereupon, one end of the link being located from the remote end of the slot a distance more than sufficient to engage with the floor surface whereon the wheel is rested and, when vertically disposed, to position the remote end of the slot in spaced relation with the axle pin, said link, while continuing its engagement with the floor, being automatically reversible from a forwardly to a rearwardly inclined position and vice versa in response to rolling movement of the wheel in one direction or the other.

2. A caster in which is comprised a non-conducting wheel, a yoke consisting of a hood encasing the upper portion of the wheel and having spaced walls extended down along opposite sides of the wheel to a point below its axis, an axle pin for the wheel supported at its two ends by the spaced walls of the yoke, a drag link of conducting material fitted between one side of the wheel and the adjacent wall of the yoke, the drag link being formed endwise thereof with a closed slot through which the axle pin is extended in a manner to permit free movement of the link to slide lengthwise of itself upon the pin and also to rotate thereupon, one end of the link being located from the remote end of the slot a distance more than sufficient to engage the floor surface whereon the wheel is rested and, when vertically disposed, to position the remote end of the slot in spaced relation to the axle pin, said slot extending from a point adjacent the center of the drag link along the link and terminating short of one end thereof, the other end portion of the link forming a gravity acting floor engaging portion, said link, while continuing its engagement with the floor, being automatically reversible from a forwardly inclined position to a rearwardly inclined position and vice versa in response to rolling movement of the wheel in one direction or the other, and stop means arranged interiorly of said hood for supporting the gravity acting floor engaging portion of the link in a raised position off the floor when the link has been rotated through more than 180° from the vertical.

EDWARD SCHULTZ.

REFERENCES CITED

The following references are of record in the file of this patent:

UNITED STATES PATENTS

| Number | Name | Date |
| --- | --- | --- |
| 442,093 | Bates | Dec. 9, 1890 |
| 608,234 | Slayton | Aug. 2, 1898 |
| 619,896 | Lee | Feb. 21, 1899 |
| 535,033 | Velen | Mar. 5, 1895 |
| 918,636 | Young | Apr. 20, 1909 |